3,567,821
MEDICAMENT FOR THE AFFECTIONS OF MUCOUS MEMBRANES
Lucien Nouvel, 91 Avenue des Ternes, Paris 17, France
No Drawing. Continuation of application Ser. No. 410,758, Nov. 12, 1964. This application May 23, 1968, Ser. No. 732,497
Claims priority, application France, Nov. 13, 1963, 953,570; May 14, 1964, 974,500
The portion of the term of the patent subsequent to Feb. 20, 1985, has been disclaimed
Int. Cl. A61k *17/00*
U.S. Cl. 424—93      10 Claims

This invention relates to medicaments for mucous membranes comprising gastric mucin plus sialic acid. The medicament may also contain lyophilized bacteria.

This application is a continuation of Ser. No. 410,758, filed Nov. 12, 1964 and now abandoned.

The new medicament which forms the subject of the present invention is intended for the treatment of various affections, of which the main or secondary seat is a mucous membrane; it is in addition applicable to the prophylaxis of the mucous membranes.

The majority of the known medicaments which are used on the mucous membranes, particularly in the area of the nasopharynx, are based on more or less toxic substances, of which the application, particularly over a period, may present disadvantages. Where disinfectants are concerned, the efficacy thereof against the micro-organisms generally has, as corollary, the more or less severe destruction of the mucous itself. On the other hand, as regards for example the gastric mucous membrane, there are known the troublesome effects which are exerted thereon by the antirheumatic treatments using cortisone, and particularly those with "butazolidin," or hypotensive agents, as in the case of the administration of reserpine.

The present invention, on the other hand, relates to a product which, while being efficient in its action against various affections of the mucous membrane, activates the epithelial restoration and the reconstitution of the damaged mucous membrane. Furthermore, the new medicament makes it possible to protect these latter against alteration due to different biological or chemical factors, and particularly against the effects of medications containing cortisone, antirheumatic, hypotensive medications or others.

The new medicament according to the invention is formed by sialic acid (N-acetylneuraminic acid), accompanied by muco-polysaccharides and/or muco-proteins, to which are optionally added one or more medicinal substances, such as antiseptics for the respiratory passages or digestive tube, soothing or absorbent substances (contactanaesthetics, tranquillizers) or useful (non-pathogenic) cultures of intestinal bacilli.

The invention results from the unexpected discovery that sialic acid has a very marked protective action on the mucous membranes, and that this action is facilitated by viscous substances which are capable of being spread and adhering to the mucous membranes, thereby serving as a support and vehicle for the sialic acid. It has thus been found that the natural substances of animal origin, belonging to the class of muco-polysaccharides and muco-proteins, are particularly suitable as viscous substances to be associated with the sialic acid in order to form the medicament according to the invention. Such substances can easily be extracted from animal organisms, especially in the well-known mucin form.

The preferred composition of the medicament according to the invention thus comprises sialic acid in the mucin and this combination is designated in the following description by the term "mucin S," which signifies mucin containing a substantial proportion of sialic acid.

Although the composition of the mucins varies according to the origin of the substances, constituents of the mucus, and although it is relatively complex, the mucins nevertheless constitute well-defined products. Bibliographic data exist concerning their composition, properties and preparation, including quite recently the article by Ward Pigman "Etude Comparative des Mucines d'Origines Diverses," which appeared in Exposes Annuels de Biochimie Medicale, 1963, pages 67–84. Other studies were published by A. Gottschalk et al, in Biochim-Biophys. Acta 42, 141, 1960 and 20, 560, 1956 as well as 23, 649, 1957, and by R. A. Gibbons in Biochem. J. 73, 209, 1959. In particular, it is known that the mucins, whether they are of sub-maxillary, sublingual, gastric, intestinal or genital origin, contain amino acids, glucides and hexosamines.

Certain of these mucins contain sialic acid; this is particularly the case with the mucins extracted from the intestines or sub-maxillary, sublingual or genital glands of sheep, cattle or pigs, these being fairly rich in sialic acid. On the contrary, the gastric mucins—probably because of the acidity of the stomachal medium—are free from sialic acid after their extraction, or contain insufficient proportions thereof for the therapeutic action according to the invention; this absence is proved by the negative Warren reaction, that is to say by the absence of the characteristic pink coloration which is given by the positive Warren reaction or the Svennerholm reaction.

The procedures of the characteristic reactions of sialic acid (N-acetylneuraminic acid) are described in the Journal of Biolog. Chemistry, vol. 237, No. 5, May 1962 by Leonard Warren and Herbert Felsenfeld "The Biosynthesis of Sialic Acid," and in Biochimica and Biophysica Acta, vol. 24, 1957, page 604 by Lars Svennerholm.

When a mucin contains a sufficient proportion of sialic acid, for example more than 0.5% or better still 1% to 40%, when dry, it can be considered as "mucin S" and be used in or as the medicament according to the invention, without further addition of this acid. Mucins with little or no sialic acid, particularly those of the stomach, still constitute excellent viscous supports for the medicament according to the invention: sialic acid or, more economically, a mucin S with a high content of this acid, is incorporated into said mucins, so that the content of said acids in the said mucin is 0.5 to 40% and preferably 1 to 40%, the mucin being in dry state.

The most practical sources of mucins are the organs or glands of animals, particularly sheep, pigs and cattle. The composition varies according to the species of the animal and the nature of the organ or gland and, of course, on the method of extraction and purification of the mucin. Nevertheless, the mucins of animal origin, extracted by the conventional method, are all suitable for the preparation of the medicament according to the invention.

In general terms, the mucins S are suitable for use in all the forms employed in pharmacy, namely: solutions, ointments, jellies, powders, dragées, tablets, gelatine-coated pills, suppositories, etc., the preparation of which is similar to that of the other medicaments and consequently does not have to be described therein.

The appropriate form is chosen in known manner according to the affection to be treated.

The medicament according to the invention may comprise a more or less purified mucin, or even an extract of animal origin containing mucin. It may sometimes be expedient to make use only of certain of the constituents of natural mucins, in which case the mucin is subjected to a preliminary treatment for the purpose of separating the desired constituents. Thus, for example, for administration to young children, it is desirable to eliminate the proteic parts from the mucin (which can be carried out by an enzymatic treatment) in order to preserve only the muco-polysaccharides.

PREPARATION OF THE MUCIN

One method of preparing the mucin for the medicament according to the invention consists in mincing the glands of animals, extracting the mucin with water, precipitating it with an appropriate reagent, separating the precipitate from the liquid, and then redissolving in saline medium and reprecipitating from alcohol. The redissolving and reprecipitating operations are optionally repeated several times, depending on the degree of purity which is desired.

By way of example, an extraction from the submaxillary glands comprises the following operations.

The conjunctive tissues are eliminated as well as possible from the minced or chopped glands, after which the pieces are spread out in large trays or troughs and covered with distilled water containing an antiseptic, such as toluene or merseptyl. The water is recovered, comprising therein the liquid expressed from the fragments of the glands by means of a press.

The extraction with water and the expressing operation are preferably repeated until the gland does not permit any more mucus to emerge. This is ascertained by the fact that acetic acid no longer gives any coagulation.

It is desirable for all these operations to be carried out in a cold room in order to avoid degeneration of the glandular tissues.

Finally, the mucin thus extracted is precipitated with ammonium acetyltrimethyl bromide and filtered. It is redissolved in a 50% calcium chloride solution. By adding 2 volumes of alcohol to 1 volume of the solution which is obtained, the mucin is reprecipitated, whereupon the precipitate is hydroextracted and dried.

Redissolving and reprecipating can be carried out several times until a product is obtained which is as pure as desired.

It is obvious that this method of procedure is also applicable to other glands.

ASSOCIATIONS WITH OTHER MEDICAMENTS

Accepting the aforesaid pharmacodynamic properties of the mucin, it is frequently of interest to associate the latter with other medicaments in order to suppress or attenuate the undesirable secondary effects of these latter or even in order easily to exert the two actions simultaneously, namely, that of the mucin and that of the other medicament or medicaments.

Consequently, in the preparations for treatment of nasopharyingeal affections, the mucin may be associated with nasal disinfectants, as in the following non-limiting example, in accordance with Formula 1.

FORMULA 1

Physiological serum—10 ml.
Mucin with 1% of sialic acid—100 mg.
Sodium mercuro-thiolate—1.5 g.
Bactericidal essence—q.s.

In connection with gastro-duodenal affections, particularly in the case of stomach ulcers, with which the aggression of the stomachal mucous overcomes the natural defence of the organism, the mucin protects the gastric wall against the attack by physiologically secreted hydrochloric acid; administered per orally, it reduces the gastric acidity and also protects the mucous from the peptic proteolysis. It may also usefully be associated with other medicaments or even be administered concurrently with these latter, for example with: gastric dressings such as silicates, kaolin, aluminum salts or bismuth; antispasmodic or anticholinergic agents, such as atropine or belladonna extract; contact anaesthetics, such as for example lignocaine hydrochloride; barbiturates or tranquillisers, such as respectively phenobarbitone or meprobamate; antihistaminics of the phenergan or other types; aperients, for example mucilages, a glycirrhizate etc.

Similarly, in the treatment of intestinal affections, the mucin contributes to improving the action of other medicaments, for example of collargol.

The concomitant administration of mucin with other medicaments is of very particular interest, in view of the protection of the gastric mucous membrane, in the treatments involving cortisone, butazolidine and reserpine, as already indicated above.

In order to illustrate the associations as referred to above, it is possible to mention the following non-limiting examples of Formulae 2 and 3.

FORMULA 2

Mucin with 5% of sialic acid—5 g.
Alumina gel—15 g.
Lignocaine—25 mg.
Saccharose—20 g.
Methyl p-oxybenzoate (antiferment)—0.2 g.
Water—q.s. for 100

This preparation, of soft consistency, is used for different treatments of the digestive tube. (See Applications I to IV given below.) The mucin present exerts a very convenient buffering effect on the pH value, particularly that of the stomach, while coating the mucous membrane.

FORMULA 3

Suppositories of the following composition:

| | Mg. |
|---|---|
| Mucin with 10% of sialic acid | 20 |
| Belladonna extract | 10 |
| Henbane extract | 10 |
| Collargol | 30 |
| Lignocaine | 3 | give good results in the treatment of constipation and false diarrhoeas.

The new medicament according to the present invention has in addition the advantage of assuring a rapid reconstitution of the intestinal mucouses, while favouring the action of the non-pathogenic coli or another useful bacillus.

According to one particular feature of the invention, the new medicament contains a fairly large proportion of sialic acid associated with the culture of one or more non-pathogenic, aerobic or anaerobic living bacilli, preferably those resistant to antibiotics, which are normal hosts of the human intestines. It is thus possible to employ *Escherichia coli*, Bifidus, Enterococci (Streptococci) and/or Lactobacilli.

The powder of intestinal mucous, or the mucin extracted from the animal intestine, is particularly useful for carrying out this form of the invention.

The medicament preferably comprises a lyophilisate of an antibiotic-resistant culture of *Escherichia coli* with one quarter to four times its weight of dry mucin S in powder form. It is highly recommended that the coli should have added thereto one or several other useful intestinal bacilli, as for example, Lactobacillus, Bifidus, Clostridium, etc.

By way of example, compositions in powder form according to the invention, which are stable and capable of being administered in the form of capsules in gelatine, may contain, per capsule:

10 to 30 mg. of lyophilisate of an antibiotic resistant, non-pathogenic living culture of *Escherichia coli*;
10 to 30 mg. of lyophilisate of a culture of *Lactobacillus lactis* or *bulgaris*;
10 to 30 mg. of intestinal mucin;
3 to 10 mg. of glutamic acid, and optionally, in addition, a lyophilisate of a culture of a normal anaerobic microorganism of the human intestine, as for example:

10 to 30 mg. of lyophilisate of a culture of *Clostridium sporogenes,* and/or
10 to 100 mg. of a lyophilisate of a culture of *Bacillus Bifidus.*

The glutamic acid may be replaced by another amino acid, such as glycocoll or glycine, leucine, alanine, valine, asparagine, aspartic acid arginine, lysine, leucylglycine, histidine or others, preferably containing 2 to 10 carbon atoms in its molecule, or their salts.

It is expedient that the medicament should contain a pH buffering substance, such as for example monosodium or disodium phosphates, monosodium and disodium tartrates, alkali citrate, alkali aspartate, etc. Nevertheless, because of the presence of the sialic acid and the use of bacterial cultures in the form of lyophilised powders, the addition of a buffering agent is no longer entirely necessary.

When the sialic acid content, preferably considered in the intestinal mucin form, is sufficiently high in the medicament according to the invention, the presence of lactic bacilli is no longer necessary.

The invention is further illustrated by the following non-limiting examples.

FORMULA 4

Gelatine capsules are each filled with a mixture of:

30 mg. of lyophilised culture of living, non-pathogenic, antibiotic-resistant *Escherichia coli;*
15 mg. of lyophilisate of a *Lactobacillus lactis* culture;
30 mg. of pig intestinal mucin;
10 mg. of glutamic acid.

The resistance of the coli to antibiotics was obtained by successive passages through media enriched with antibiotics; the strains employed had been taken from the stools of healthy individuals; they were chosen from the most usual ones and in such a way as to survive in the intestine simultaneously with that of lactobacillus.

Administered at the rate of about 75 millions of microorganisms per day, these capsules lead to the diarrhoea being arrested more quickly than without mucin S, and while reducing the irritation of the intestinal walls.

FORMULA 5

Gelatine capsules each containing:

20 mg. of lyophilised culture of *Escherichia coli,* the same as in Formula 4;
20 mg. of lyophilised culture of *Lactobacillus lactis;*
30 mg. of lyophilised culture of *Clostridium sporogenes;*
35 mg. of pig intestinal mucin;
10 mg. of glycocoll.

This medicament has the same action as that of Formula 4 but permits of applying a daily dose of *coli bacilli* reduced almost by half.

FORMULA 6

The medicament, specially intended for infants and young children comprises, per capsule, the mixture of:

30 mg. of lyophilised culture of *Bacillus bifidus;*
30 mg. of lyophilised culture of *Lactobacillus bulgaricus;*
10 mg. of sialic acid in the form of mucin;
7 mg. of aspartic acid;
3 mg. of sodium aspartate.

FORMULA 7

Capsules, such as those of the previous examples, are prepared with:

60 mg. of lyophilisate of a culture of *Escherichia coli;*
6 mg. of lyophilisate of a culture of *Streptococcus faccalis;*
20 mg. of sub-maxillary mucin containing about 30% of sialic acid.

They suppress the intestinal colic due to diarrhoea.

CLINICAL APPLICATIONS

In general terms, when it is a question of internal use, administered by the mouth or rectally, the dosage is 1 to 8 g. of mucin S with 1% of sialic acid per day, according to the age and weight of the subject and the nature of the affection; the most usual doses are 2 to 4 g. per day, independently of the concomitant medication which may have been carried out.

It is with these latter doses that the series of clinical applications have been carried out for the treatment of various affections, as indicated below.

APPLICATION I 24 cases of gastritis were treated by daily ingestion of 3 g. of mucin S in 3 or 4 doses (Formula 2 as indicated above). The post-prandial pain is soothed very rapidly by the lignocaine. This effect is maintained and, in the majority of cases, prevents the occurrence of the belated gastric pains.

The pharmacological action of high interest is represented not only by the immediate action on the pain, but also by the belated inhibition of the latter, this constituting an important advantage over the special substances used at the present time.

Of the 24 cases, 18 cases were very positive; with 6 invalids, there was a minimum reappearance of the belated pain, which was soothed by a fresh dose at the moment this pain occurred.

In 20 other similar cases, there was first of all used the same treatment, but with a Formula 2 of which the mucin originated from the stomach of a pig and did not show the Warren or Svennerholm reaction for sialic acid. The pains were generally attenuated, but they reappeared, and the condition of the patients had not improved at the end of a week. The improvement became very marked when the gastric mucin of Formula 2 was replaced by the submaxillary mucin with 26% of sialic acid.

APPLICATION II

The mucin S was used in the treatment of 12 cases of gastric ulcer.

As the majority of the persons with gastric ulcers were gastritic, the product was prescribed before meals; a dose was also administered 2 hours after the meal, and this was done systematically.

The belated pain of the persons suffering with gastric ulcers was usually soothed; a therapeutic dose was also taken with each occurrence of pain occurring unexpectedly between meals. A distinct diminution of the pains between meals was confirmed, this proving the long duration of the protective action of the preparation.

APPLICATION III

In order to treat 16 cases of duodenal ulcers, larger doses were prescribed, these being between 3.5 and 5.5 g. per 24 hours, in order to protect these invalids against the hyperchlorhydria which always characterised their affection. The therapeutic dose 3 to 4 hours after the meal always prevented the occurence of the ulcer pain.

A belated dose on going to bed prevented the conventional nocturnal cramp-like pain with many of the invalids.

This result had hitherto never been obtained with a gastric dressing, but with anticholinergic substances which acted by reducing the chlorhydria secretion.

APPLICATION IV

The treatment of persons suffering from acute and chronic diarrhoea, in 28 cases, was carried out by associating mucin S with therapeutic compounds for etiological observation (see more particularly Formula 2 as given above). Recovery was always substantially accelerated by the administration of mucin S at the rate of 3 to 5 g. per day.

APPLICATION V

The suppositories containing mucin, accompanied by collargol and extract of belladonna and henbane (Formula 3), were applied to the treatment of chronic constipation in 28 cases.

A perceptible normalisation was obtained in 20 cases. In the other 8 cases, where the action was less spectacular, these were persons suffering from constipation and with occasionally episodes of false diarrhoea or due to the presence of secondary microorganisms.

APPLICATION VI

Rhinitis was effectively combatted by means of nasal atomisation, 4 to 6 times per day, of the preparation according to Formula 1. The mucin brought to the walls of the nose a jelly-like substance which prevented the flow, thus coating the irritated mucous membrane.

APPLICATION VII 12 cases of chronic diarrhoea were treated with the medicament according to Formula 4, and 12 similar cases with the same dose of 75 millions of colibacilli per day but without mucin S. Considerable improvement occurred in the health of the 12 first persons after 3 days, while among the 12 others 8 were really better only after one week.

LABORATORY TESTS

Two groups of 30 rats, weighing about 200 g. each, were compelled to remain immobile, this causing in known manner hemorrhagic gastric ulcers. To the rats of the first group, there was administered, before the immobilisation, mucin containing 0.7% of sialic acid, at the rate of 100 mg. per animal; this substance was in the form of a mixture of 20% of mucin S, 30% of kaolin and 50% of sugar.

28 rats of the second group, which received no medicament, showed strong gastric ulcerations after 24 hours.

In the first group, treated with mucin S, and at the end of the same period, only 6 rats had ulcerous lesions, these being shallower and less numerous; 6 others were affected by congestive gastritis without ulceration, while no change was observed in 18 animals of this group.

I claim:

1. Medicament for the affection of mucous membranes constituted gastric mucin and sialic acid in an amount sufficient to provide 0.5 to 40% by weight of N-acetylneuraminic acid on a dry basis.

2. Medicament as claimed in claim 1 which comprises 20 to 60 parts by weight of a lyophilisate of a culture of *Bacillus bifidus* and 10 to 35 parts by weight of a mixture of gastric mucin and sialic acid, said mixture containing in the dry state, from 0.5 to 40% of sialic acid.

3. Medicament as claimed in claim 1 which comprises 20 to 60 parts by weight of a lyophilisate of a culture of Streptococcus and 10 to 35 parts by weight of a mixture of gastric mucin and sialic acid, said mixture containing, in the dry state, from 0.5 to 40% of sialic acid.

4. Medicament as claimed in claim 1 which comprises 20 to 60 parts by weight of a lyophilisate culture of Lactobacillus and 10 to 35 parts by weight of a mixture of gastric mucin and sialic acid, said mixture containing, in the dry state, from 0.5 to 40% of sialic acid.

5. Medicament as claimed in claim 1 which comprises 20 to 60 parts by weight of a lyophilisate culture of Clostridium and 10 to 35 parts by weight of a mixture of gastric mucin and sialic acid, wherein the mixture has a total sialic acid content of from 0.5 to 40%.

6. Medicament as claimed in claim 1 which contains 10 to 30 parts by weight of a lyophilisate of an antibiotic resistant non-pathogenic living culture of *Escherichia coli*, 10 to 30 parts of a lyophilisate of a culture of Lactobacillus, 10 to 30 parts of gastric mucin containing sialic acid to produce a content in the mucin of 0.5 to 40% sialic acid, and 3 to 10 parts of an amino acid having 2 to 10 carbon atoms in its molecule.

7. Medicament according to claim 6, which contains 10 to 30 parts by weight of a lyophilisate of a culture of *Clostridium sporogenes*.

8. Medicament according to claim 6, which contains 10 to 100 parts by weight of a lyophilisate of a culture of *Bacillus bifidus*.

9. A method of treating mucous membrane comprising applying to the mucous membrane a therapeutically effective amount of a medicament containing gastric mucin and added sialic acid, there being present 0.5 to 40% sialic acid based on said mucin.

10. A process according to claim 9 wherein there is present 1 to 40% of the sialic acid based on the mucin.

References Cited

UNITED STATES PATENTS

| | | | |
|---|---|---|---|
| 3,072,528 | 1/1963 | Kludas et al. | 424—93 |
| 3,369,969 | 2/1968 | Nouvel | 424—93 |

FOREIGN PATENTS

| | | |
|---|---|---|
| 644,455 | 8/1964 | Belgium. |
| 2,828 | 10/1964 | France. |

OTHER REFERENCES

Extra Pharmacopoeia, 22nd ed., vol. 1, published by The Pharmaceutical Press, London, 1941, page 579.

RICHARD L. HUFF, Primary Examiner

U.S. Cl. X.R.

424—104